United States Patent [19]

Bishay et al.

[11] Patent Number: 5,373,458
[45] Date of Patent: Dec. 13, 1994

[54] ENCLOSURE FOR A HAND-HELD COMPUTER

[75] Inventors: John Bishay, Mukilteo; Joseph Erno, Seattle, both of Wash.

[73] Assignee: Intermec Corporation, Everett, Wash.

[21] Appl. No.: 85,405

[22] Filed: Jun. 30, 1993

[51] Int. Cl.⁵ .................. G06F 1/00; H05K 5/00; A45C 11/00
[52] U.S. Cl. .................. 364/708.1; 206/305; 361/680
[58] Field of Search .............. 364/708.1; 361/680; 206/305, 320, 569, 576, 594, 592; 235/1 D

[56] References Cited

U.S. PATENT DOCUMENTS

| | | | |
|---|---|---|---|
| 4,469,765 | 9/1984 | McCartney et al. | 429/123 |
| 4,703,161 | 10/1987 | McLean | 235/1 D |
| 5,002,184 | 3/1991 | Lloyd | 206/305 |
| 5,105,338 | 4/1992 | Held | 206/305 |
| 5,113,360 | 5/1992 | Satou | 361/680 |
| 5,134,245 | 7/1992 | Katz | 206/320 |
| 5,197,178 | 3/1993 | Lichte et al. | 206/305 |
| 5,214,574 | 5/1993 | Chang | 206/305 |
| 5,285,901 | 2/1994 | Huang | 206/320 |

*Primary Examiner*—Tan V. Mai
*Attorney, Agent, or Firm*—Seed and Berry

[57] ABSTRACT

A computer enclosure having a first enclosure portion with an integral display window and side panels, a resilient elastomeric molding covering the side panels by encapsulating a flange portion around the side panels so as to form a permanent mechanical bond between the resilient molding and the side panels. An elastomeric fitting connects to the first enclosure portion surrounding the display window to protect the window from impact damage. An elastomeric gasket fits on the inside perimeter of the display window to form an impact-resistant interface between the display window and a computer display component within the hand-held computer. A second enclosure portion forms the bottom of the computer enclosure.

18 Claims, 2 Drawing Sheets

ENCLOSURE FOR A HAND-HELD COMPUTER

TECHNICAL FIELD

The present invention relates to an enclosure for a computer, and more particularly, to a hand-held computer enclosure with a resilient molding connected thereto.

BACKGROUND OF THE INVENTION

Computers have been developed and utilized extensively in industry to enable a person to work in a productive, time-efficient, and cost-efficient manner. Hand-held computers, such as symbology readers and scanners, have enabled workers to quickly scan bar codes or other symbologies to identify or monitor virtually any item that can be labeled with a given code or symbol. For example, maintaining accurate inventory records or product location records can be easily accomplished by scanning coded items on a regular basis.

Although the hand-held computers are very mobile, the units are fairly fragile and susceptible to extensive repairs or replacement when the computer is inadvertently impacted or dropped. In addition, hand-held computers are often exposed to a variety of environmental elements during the ordinary course of use, such as rain water, dust, other debris, and electrostatic discharge that can damage the computer's internal components.

Attempts have been made to create enclosures that protect hand-held computers from impact damage and the environmental elements. U.S. Pat. No. 5,002,184 (Lloyd) discloses a removable soft case that engulfs an entire computer and covers the computer's display screen only when the case is closed. Such a case protects the computer but substantially increases the size of the unit. While the closed case acts to cushion and distribute impact loads across the computer's glass screen, this desired protection does not exist when the case is open. Similarly, the case does not protect the computer while in use from water, dust or other debris contacting the display screen or penetrating into the computer through seams around the screen.

Bumper strips of impact-resistant material glued to the computer housing have also been used to protect hand-held computers. While a bumper strip can provide some impact protection, the bumper strips do not provide adequate protection at the corners or edges of the computer, which are most often the areas subject to impact. In addition to inadequate impact protection, the computer housing is still susceptible to damage from water, dust, or other debris entering the computer's interior through seams in the housing. Furthermore, no electrostatic discharge protection is provided by the bumper strips.

SUMMARY OF THE INVENTION

The computer enclosure of the present invention includes a first enclosure portion having a top panel with an integral display window and side panels around the top panel. A resilient molding is securely attached to the first enclosure so as to surround the first enclosure while leaving the display window uncovered and thus unobscured. The molding is adapted to receive a second enclosure portion having a bottom panel and side panels around the bottom panel. The resilient molding that surrounds the side panels of the first enclosure portion engages the side panels of the second enclosure portion so as to form a seal between the first and second enclosure portions.

In an illustrated embodiment of the present invention, the computer enclosure has a first enclosure portion made from a translucent, rigid, one-piece molded core. The molded core has the top panel, a seamless display window integral to the top panel, and side panels having a flanged portion at the bottom of the side panels. An elastomeric, impact-resistant molding encapsulates the flanged portion, and a fitting of the same or similar molding material attaches to the top panel adjacent to the display window in a manner that protects the edges of the transparent window while leaving the window substantially unobstructed. The top panel and the side panels form a computer component receiving area into which a computer display unit nests and can float or move relative to the first enclosure portion. A resilient gasket connects to the first enclosure portion within the computer enclosure along the display window's inside perimeter so as to form an impact-resistant interface between the display window and the computer display unit. The resulting computer enclosure creates an impact-resistant enclosure with a seamless protective display area that prevents water or debris from penetrating into the interior of the computer enclosure.

Further advantages of the present invention will become apparent from the following detailed description of the preferred embodiment taken in conjunction with the following drawings.

DETAILED DESCRIPTION OF THE INVENTION

Figure 1:
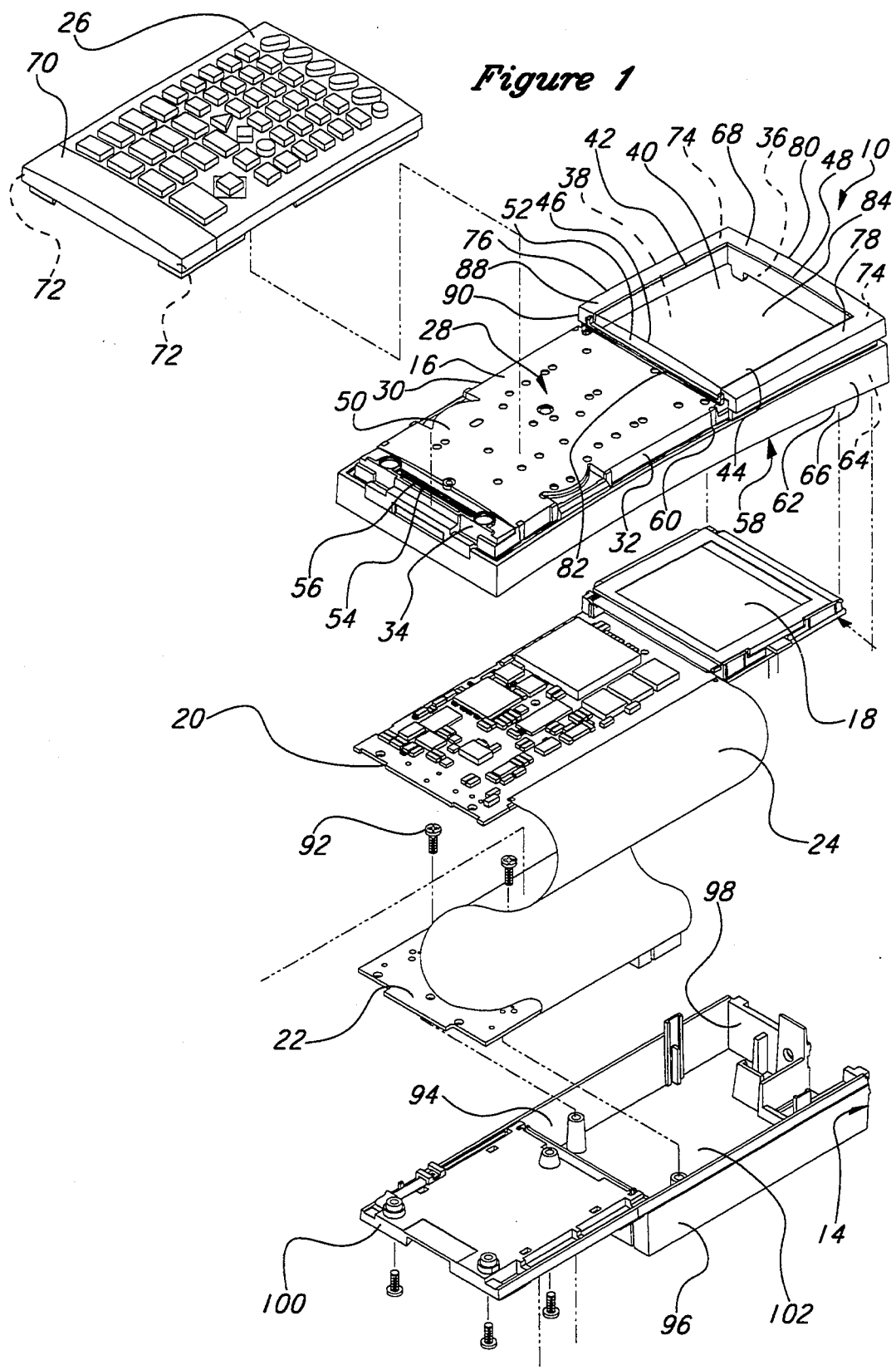
FIG. 1 is an exploded rear isometric view of a hand-held computer with a resilient computer enclosure assembly in accordance with the present invention.

As seen in FIG. 1, a computer enclosure assembly 10 in accordance with the present invention is shown in combination with several components discussed below that make up a hand-held computer 12. The assembly 10 has a bottom enclosure portion 14 and a top enclosure portion 16 which mate together to form a computer housing. In the preferred embodiment, the hand-held computer 12 is a symbology reader manufactured by Intermec Corporation, of Everett, Wash.; however, the invention may be used with any hand-held computer.

The top enclosure portion 16 is shaped to receive and protect a glass computer display screen 18 that is flexibly connected to a printed circuit board 20. The bottom enclosure portion 14 is shaped to receive an accessory interface board 22 that is connected to the printed circuit board 20 by a flexible connector cable 24. When the bottom and top enclosures 14 and 16 are connected, the display screen 18, printed circuit board 20, interface board 22, flexible cable 24, and other internal computer components are enclosed and protected. The top enclosure portion 16 is adapted to receive on its exterior a removable keypad 26 that is operatively connected to the printed circuit board 20 within the enclosure, such that a user can input data or commands into the handheld computer 12.

The top enclosure portion 16 has a top panel 28 integrally molded with a left side panel 30, a right side panel 32, a rear side panel 34, and a front side panel 36. The top panel 28 and side panels 30, 32, 34, and 36 together form an internal receiving area 38 that receives the display screen 18 and printed circuit board 20 fully therewithin. The entire top panel 28 is molded from a plastic material with a transparent integral display window 40 formed therein that extends to the front side panel 36 and the forward portions of the left and right side panels 30 and 32, respectively. The display window 40, having a left edge 42, a right edge 44, a front edge 48, and a rear edge 46 is adapted to receive the display screen 18 such that the user can read the display screen through the display window while using the assembled computer 12. The top enclosure portion 16 further has a generally flat face 50 adjacent to the rear edge 46 of the display window 40, the rear side panel 34, and the rear portions of the left and right side panels 30 and 32, respectively. The rear edge 46 is raised from the flat face 50, thereby forming a vertical abutment 52 between the rear edge of the display window 40 and the flat face 50. The flat face 50 is adapted to removably receive the keypad 26 such that the edges of the keypad are flushed with the left, right, and rear side panels 30, 32, and 34, and the keypad's forward edge engages the vertical abutment 52. The flat face 50 has an aperture 54 therein adjacent to the rear side panel 34 that is shaped to receive an elastomeric electrical connector 56 that interconnects the keypad 26 to the printed circuit board 20.

In the preferred embodiment, the top enclosure portion 16 is a one-piece molded plastic core effectively forming half of the computer housing having no seams around the display window 40 so as to receive and better protect the computer components positioned therewithin. The integrally molded, seamless display window 40 construction maintains the structural rigidity of the top enclosure portion 16 to provide greater strength and better durability for the assembly 10.

Figure 3:
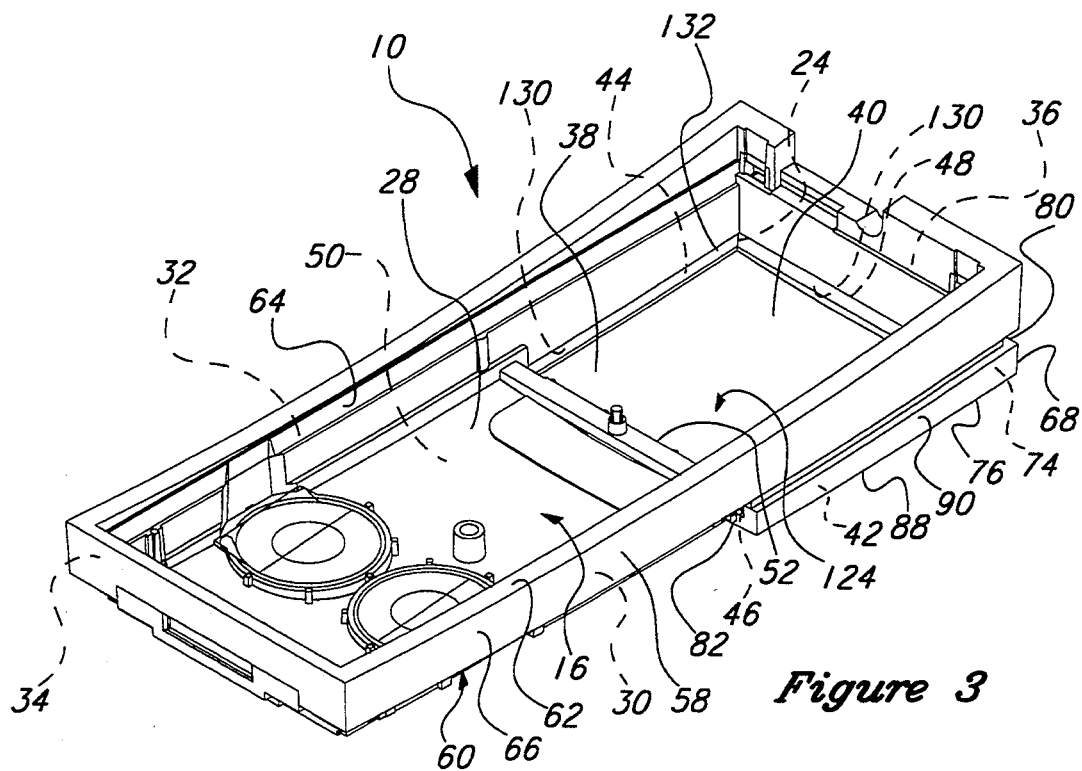
FIG. 3 is a rear perspective view of the inside of the top enclosure portion of FIG. 2 with the resilient molding and gasket in place.

As best seen in FIGS. 1 and 3, an overmold or molding 58 made of a resilient, impact-resistant, elastomeric material, such as Alcryn, manufactured by the DuPont Corporation, or the like, engages the side panels 30, 32, 34, and 36 of the top enclosure portion 16 so as to surround the top enclosure portion while leaving the display window 40 unobscured. The molding 58 has a top face 60, a bottom face 62, an inside face 64, and an outside face 66. The molding 58 effectively protects the computer 12 from internal and external damage as a result of being dropped or inadvertently impacted. In addition, the molding 58 also provides a tactile surface that the user can better grasp while using the computer.

In the preferred embodiment, the molding 58 covers the lower portions of the side panels 30, 32, 34, and 36 such that the uncovered upper portions of the side panels can receive the keypad 26 and a resilient window fitting 68, discussed in greater detail below, that surrounds but does not block the display window 40. Accordingly, when the keypad 26 is installed on the top enclosure portion 16, the keypad is affixed to the flat face 50 of the enclosure portion, and the uncovered sections of the left, right, and side panels 30, 32, and 34, respectively, except for the display window 40, of the top enclosure portion are covered. The keypad 26 has a lower strip 70 made of resilient elastomeric material or the like that protects the rear corners 72 of the keypad from impact damage. Thus, the lower strip 70 of the installed keypad 26 works in conjunction with the molding 58 around the rear portion of the top enclosure 16 to protect the computer 12 from impact damage.

The resilient window fitting 68 is shaped to fit around the exterior edges of the display window 40 and provides protection to its four corners 74. The window fitting 68 is made of a resilient, impact-resistant, elastomeric material, preferably the same material as the molding 58. The window fitting 68 has a left section 76, a right section 78, a forward section 80, and a rear section 82 that are interconnected to define an aperture 84 through which the display window 40 is visible. The window fitting 68 extends around an outer perimeter 86 of the display window 40 without blocking the display window, thereby allowing the user an unobstructed view of the display screen 18 within the top enclosure portion 16. The left, right, and forward sections 76, 78, and 80, respectively, of the window fitting 68 each have a top surface 88 that lies in the same plane as the display window 40 and a side surface 90 that is substantially perpendicular to the top surface 88. The side surfaces 90 engage and cover the uncovered forward portions of the left, right, and forward side panels 30, 32, and 34 of the top enclosure portion 16, and the top face 60 of the molding 58 toward the forward end portion of the top enclosure portion. The rear section 82 of the window fitting 68 extends along the vertical abutment 52 in a recess formed between the abutment and the forward end of the flat face 50 of the top enclosure portion 16. The rear section 82 is shaped so as to fit under and not interfere with the forward end of the keypad 26 when it is affixed to the flat face 50. In the preferred embodiment, the window fitting 68 is adhered to the top enclosure portion 16 with a conventional adhesive, although it could be attached using any other suitable process.

As best seen in FIG. 1, the top enclosure portion 16 with the molding 58 connected thereto engages the bottom enclosure portion 14 and is secured in place with screws 92 or other conventional connecting devices. The bottom enclosure portion 14 also has left, right, forward, and rear side panels, 94, 96, 98, and 100, respectively, that are integrally molded with a bottom panel 102, which together form the bottom half of the computer's housing. The side panels 94, 96, 98, and 100 of the bottom enclosure portion 14 are shaped to snugly engage the corresponding side panels 30, 32, 34, and 36 of the top enclosure portion 16 with the molding 58 attached thereto.

When the bottom and top enclosure portions 14 and 16 are assembled together, the molding's inside face 64 presses against the side panels 94, 96, 98, and 100 of the bottom enclosure portion around the perimeter of the assembly 10 and the top enclosure's side panels 30, 32, 34, and 36 snugly overlap the bottom enclosure's side panels. As a result, a seal is formed between the top enclosure portion 16 and the bottom enclosure portion 14. The resulting seal effectively prevents water, dust, or other debris from getting within the assembly 10 and damaging the computer components therewithin. The seal also greatly alleviates the risk of damage from electrostatic discharge.

Figure 2:
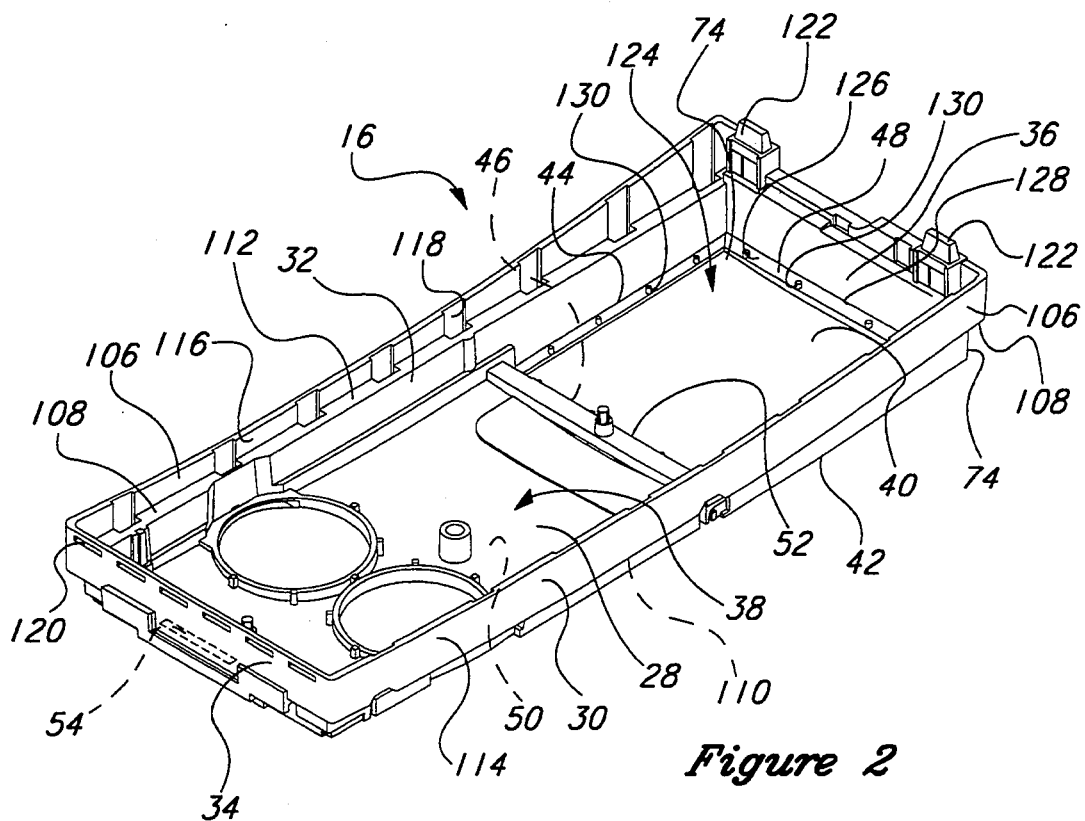
FIG. 2 is an enlarged, rear perspective view of the inside of a top enclosure portion of the computer enclosure assembly of FIG. 1 with its resilient molding and gasket removed.

As best seen in FIG. 2, the top enclosure portion 14 is a molded core having no seams between the integral display window 40, the top panel 28, and the side panels 30, 32, 34, and 36. This prevents the possibility of electrostatic discharge through seams or gaps around the window as can occur with prior art hand-held computers. In the preferred embodiment, the top enclosure portion 16 is made of a polycarbonate or the like that is shaped to form a hard rigid core to which the molding 58 is permanently attached. The top enclosure 16 is primarily translucent with the display window 40 being transparent such that computer's display screen 18, as seen in FIG. 1, is visible and not distorted through the display window.

Each of the left, right, forward, and rear side panels 30, 32, 34, and 36 of the top enclosure portion 16 has a flange 106 connected thereto along the perimeter of the top enclosure portion. The flange 106 forms an outward extending step or shoulder 108 having a top horizontal surface 110, a bottom horizontal surface 112, an outside vertical face 114, and an inside vertical face 116. A plurality of channels 118 are formed in the flanges 106 having relatively uniform spacing therebetween around the perimeter of the top enclosure portion 16. The channels 118 extend through the shoulder 108 fully between the top horizontal surface 110 and the bottom horizontal surface 112, and along the inside vertical face 116. As best seen in FIGS. 2 and 3, the molding 58 is molded over the top enclosure portion 16 so that the molding connects to the side panels 30, 32, 34, and 36 with the flange 106 and shoulder 108 encapsulated within the molding, thereby permanently securing the molding to the top enclosure portion 16. Although the molding 58 can be connected to the top enclosure portion 16 by different techniques, the molding in the preferred embodiment is injection-molded around the flanges 106 and through the channels 118 such that the molding is permanently and mechanically connected to the top enclosure portion.

The preferred embodiment has a plurality of apertures 120 in the rear side panel 34 rather than the flange and shoulder arrangement just described. If desired, the flange and shoulder arrangement could be utilized around the entire perimeter of the top enclosure portion 16. The apertures 120 provide openings through which the molding 58 can flow during the overmolding, thus encapsulating and permanently bonding to a lower portion of the rear side panel 34.

The preferred embodiment also has tabs 122 connected to the bottom edge of the front side panel 36 of the top enclosure portion 16. The tabs 122 provide an additional surface to which the molding 58 bonds. As a result of the channels 118, the apertures 120, and the tabs 122, the resilient molding 58 is securely and permanently connected to the top enclosure portion 16 such that the molding will not peal away from the top enclosure portion over time.

As indicated above and referring back to FIG. 1, the top enclosure portion 16 is shaped to receive, inter alia, the printed circuit board 20 and the display screen 18. The top enclosure portion 16 is designed such that the printed circuit board 20 is securely held between the top enclosure portion and the bottom enclosure portion 14, and the display screen 18 is sized to fit loosely within a recessed area 124 between the top and bottom enclosure portions immediately under the display window 40. Thus, the display screen 18 is moveably held within the recessed area 124 in the top enclosure portion 16. The top enclosure's relatively loose engagement of the display screen 18 allows the display screen to float and move behind the display window 40. This movement helps reduce the level of shock transmitted to the glass display screen 18, thereby reducing the impact damage to the internal components. An alternative embodiment of the top enclosure portion 16, not shown, also allows the printed circuit board 20 to float, thereby dampening any impact force on the circuitboard.

The recessed area 124 is formed by the forward portions of the left, right and forward side panels 30, 32, and 34 of the top enclosure portion 16, and the vertical abutment 52. The recessed area 124 is shaped and sized such that the display screen 18 is loosely received therewithin and is held behind the display window 40. As best seen in FIG. 2, the recessed area 124 has a narrow strip 126 extending about the perimeter of the display window 40.

A plurality of engagement pins 130 extend downward into the recessed area 124 from the strip 126. The engagement pins 130 engage and secure a resilient gasket fitting 132, as best seen in FIG. 3, around the display window's inside perimeter. The computer display screen 18 loosely engages the gasket 132 when assembled into the recessed area 124. The gasket 132, which is made of an elastomeric material similar to or the same as the molding 58, forms an impact-absorbing member that protects the computer display screen 18 from impact forces. Thus, top enclosure portion 16 has the display screen 18 nested within the recessed area 124 such that the display screen floats and is effectively cushioned from damaging impacts. In the preferred embodiment, the gasket 132 is connected to the engagement pins 130 by injection molding the elastomeric material around the perimeter of the receiving area 24. However, the gasket 132 can be attached to the top enclosure portion 16 by bonding the gasket thereto with a suitable adhesive.

Numerous modifications and variations of the resilient enclosure assembly for a hand-held computer disclosed herein will occur to those skilled in the art in view of this disclosure. Therefore, it is expressly to be understood that these modifications and variations, and equivalents thereof, may be practiced while remaining within the spirit and scope of the invention as defined in the following claims.

We claim:

1. An enclosure for a hand-held computer comprising:
   a first enclosure portion having a top panel, a display window formed integral with said top panel, and side panels connected to said top panel;
   a second enclosure portion having a bottom panel and side panels connected to said bottom panel; and
   a resilient molding attached to said first enclosure so as to at least partially surround said first enclosure side panels and top panel while leaving said display window substantially unobscured, said molding adapted to engage said second enclosure side panels so as to form a seal between said first and second enclosure portions.

2. The enclosure of claim 1 wherein said first enclosure side panels have a flange portion that is encapsulated by said resilient molding to fixedly attach said resilient molding to said first enclosure side panels.

3. The enclosure of claim 2 wherein said flange portion has apertures therein, said resilient molding extending through said apertures to form a permanent connection between said resilient molding and said first enclosure side panels.

4. The enclosure of claim 1 wherein said first enclosure portion is a rigid, one-piece, molded unit.

5. The enclosure of claim 4 wherein said first enclosure portion is manufactured of a translucent plastic.

6. The enclosure of claim 1 wherein said resilient molding is manufactured of a flexible, impact resistant, elastomeric overmold bonded to said first enclosure portion.

7. The enclosure of claim 1, further including an external resilient fitting extending around said display window to protect said display window from impact damage.

8. An enclosure for a computer comprising:
- a first enclosure portion shaped to receive a circuit board component and computer display component, said enclosure having a top panel, a display window formed integral with said top panel, and side panels forming a component receiving area, said display window having an inside surface and an inside perimeter portion that communicates with said display component;
- a resilient covering attached to said side panels and said top panel forming a protective covering around said first enclosure such that said display widow is substantially unobscured; and
- a second enclosure portion having a bottom panel and side panels connected to said bottom panel, said second enclosure side panels adapted to engage said resilient covering so as to form a seal between said first and second enclosure portions.

9. The enclosure of claim 8 wherein said resilient covering comprises an impact resistant elastomeric material molded onto said first enclosure side panels, and a fitting secured to said first enclosure portion around said display window.

10. The enclosure of claim 8 wherein said first enclosure portion is manufactured of a rigid, one-piece, molded enclosure portion.

11. The enclosure of claim 10 wherein said first enclosure portion is manufactured of a translucent plastic enclosure portion.

12. The enclosure of claim 8 wherein said first enclosure side panels have a flange portion encapsulated by said molding to fixedly attach said resilient molding to said first enclosure side panels.

13. The enclosure of claim 12 wherein said flange portion has apertures therein, said resilient molding extending through said apertures to form a permanent connection between said resilient molding and said first enclosure side panels.

14. The enclosure of claim 8, further including a resilient gasket connected to said inside perimeter of said display window to form an impact resistant interface between said display window and the computer display components.

15. The enclosure of claim 14 wherein said component receiving area shaped to loosely receive the computer display component in a nesting manner thereby allowing said display component to move relative to said first enclosure.

16. The enclosure of claim 8 wherein said first enclosure portion and said second enclosure portion are sized to form a housing for a hand-held computer.

17. A method of manufacturing a computer enclosure having a top enclosure portion with a top panel, a display window integral with said top panel, and side panels connected to the top panel, and a bottom enclosure portion with a bottom panel and side panels connected to the bottom panel, comprising the steps of:
- molding the top enclosure portion with the display window being transparent;
- molding the bottom enclosure portion; and
- injection-molding a resilient elastomeric material onto the top enclosure side panels such that the display window is substantially unobscured, and the resilient elastomeric material encapsulates at least a portion of the top enclosure side panels.

18. The method of claim 17, further comprising the step of assembling the top and bottom enclosure portions with the resilient elastomeric material engaging the bottom enclosure side panels to form a seal between the top and bottom enclosure side panels.

* * * * *

UNITED STATES PATENT AND TRADEMARK OFFICE
CERTIFICATE OF CORRECTION

PATENT NO. : 5,373,458
DATED : December 13, 1994
INVENTOR(S) : John Bishay and Joseph Erno It is certified that error appears in the above-indentified patent and that said Letters Patent is hereby corrected as shown below:

In column 7, claim 8, line 21, please delete "widow" and substitute therefor --window--.

Signed and Sealed this

Fifteenth Day of August, 1995

*Attest:*

BRUCE LEHMAN

*Attesting Officer*     Commissioner of Patents and Trademarks